No. 639,223. Patented Dec. 19, 1899.
J. F. GAIL.
SPRING BED AND SEAT BOTTOM.
(Application filed Jan. 16, 1899.)
(No Model.)
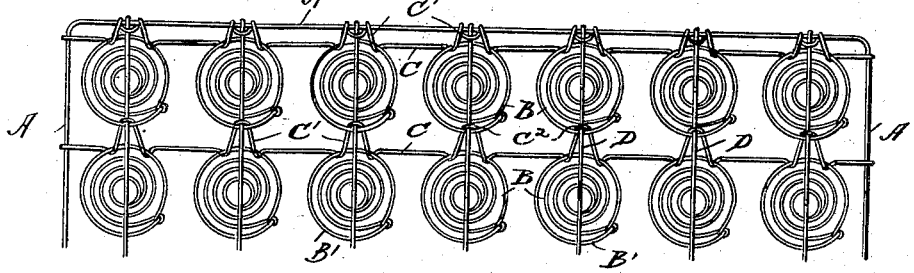
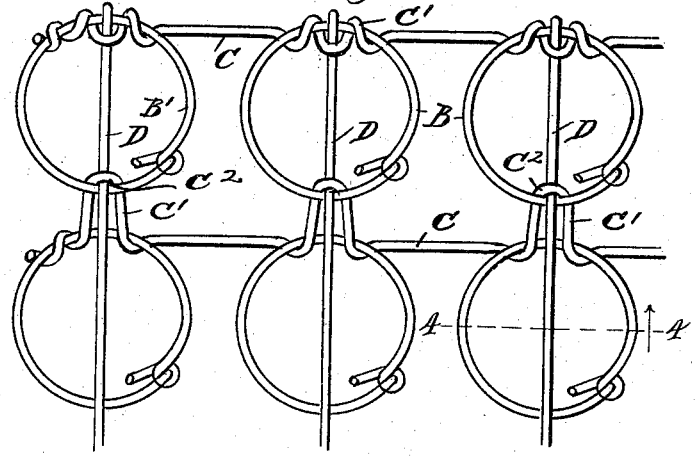
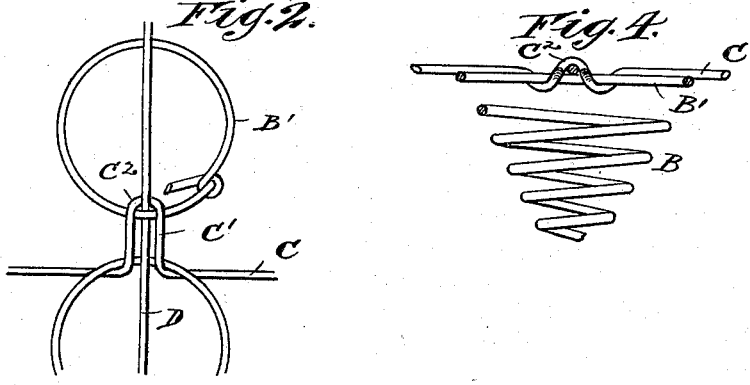
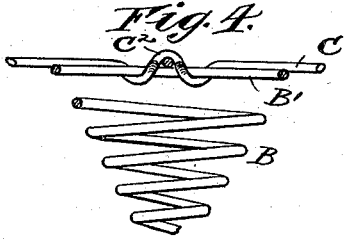
Witnesses,
D. F. Mann,
M. A. Witmer.
Inventor,
John F. Gail
By Cyrus Kehr
Atty.

UNITED STATES PATENT OFFICE.

JOHN F. GAIL, OF KENOSHA, WISCONSIN, ASSIGNOR TO THE SIMMONS MANUFACTURING COMPANY, OF SAME PLACE.

SPRING BED AND SEAT BOTTOM.

SPECIFICATION forming part of Letters Patent No. 639,223, dated December 19, 1899.

Application filed January 16, 1899. Serial No. 702,349. (No model.)

*To all whom it may concern:*

Be it known that I, JOHN F. GAIL, a citizen of the United States, residing at Kenosha, in the county of Kenosha and State of Wisconsin, have invented certain new and useful Improvements in Spring Bed and Seat Bottoms, (Case B;) and I do hereby declare the following to be a full, clear, and exact description of the invention, such as will enable others skilled in the art to which it appertains to make and use the same, reference being had to the accompanying drawings, and to letters of reference marked thereon, which form a part of this specification.

For convenience in making cross-reference this application is designated as "Case B," and four other applications for Letters Patent for bed-bottoms executed by me of even date herewith are designated, respectively, "Case A," "Case C," "Case D," and "Case E." In said application designated as "Case A" generic claims are made to features of construction common to all of said applications. The others of said applications are relatively specific in their scope.

My invention relates particularly to spring bed-bottoms formed of vertical spiral springs united horizontally by tie-rods.

The improvement involves the use of a new form of tie-rod which permits the use of the simplest form of vertical spiral springs and which allows the ready assembling of the parts of the bed-bottom to constitute the finished structure. There is economy in the ready assembling of these parts, and there is also economy in the use of a simple form of the spiral spring.

My improvement results in a structure which has a high degree of strength, a distribution of strain applied at any particular point, and an even surface.

In the accompanying drawings, Figures 1 and 3 are plans of portions of a bed-bottom embodying my improvement in two forms. Fig. 2 is a detail showing a modification. Fig. 4 is a section on line 4 4 of Fig. 3 looking in the direction of the arrow.

Inasmuch as the general construction of bed-bottoms of this class is well known, I deem it sufficient to illustrate only portions of bed-bottoms showing the application of my improvement.

Referring to said drawings, A is a rectangular frame forming the margins of the bed-bottom. This frame may be of wood or metal; but it is preferably made of metal rods or bars somewhat heavier than the metal of the springs and tie-rods.

B B are the springs. These are arranged in rows parallel to the sides of the frame A and are in vertical position and of spiral form, the upper end of each being formed into a complete ring B' by "knotting" or in any other suitable manner. The springs may be cylindric in outline or they may be conical or double conical. As already stated, it is the object of the invention to embody the well-known forms of vertical springs into a bed-bottom of superior quality and the parts of which may be readily made and readily assembled.

C is a tie-rod extending transversely across the bed-bottom and having its ends suitably attached to the frame A and engaging two rows of springs B. The tie-rods below or under the rings B' of the springs of one transverse row are provided with V-shaped folds or loops C', extending upward through the ring of that spring and then across horizontally below and through the ring of the adjacent spring of the next transverse row, the loop being bent vertically, so as to extend upward through the last-mentioned ring, out of the plane of the latter. The transverse rows of springs B adjoining the frame A are united to said frame by one of said tie-rods, the loops C' extending partially around the said frame. Another set of tie-rods D D (which for convenience I will term "key-rods") are arranged at right angles to the tie-rods C. These are straight and extend centrally over the longitudinal rows of springs B and beneath the vertical part $C^2$ of each loop C' in the row of springs traversed by said key-rod. The ends of the key-rod D may be suitably secured to the frame A, preferably in engagement with a loop C', engaging the frame at that point, the rod reaching through the loop.

It will now be seen that the bed-bottom illustrated by said Fig. 1 consists of only four kinds of parts—namely, the frame A, springs B, tie-rods C, bearing the loops, and the straight key-rods D; and it will now be understood that the assembling of these parts to form the complete bed-bottom is a simple process involving only the use of the hands and a simple bending-tool for securing the ends of the tie-rods and key-rods. The frame may be first put into position and the springs then placed in rows within the frame. The tie-rods C are then put into position with reference to the springs and the frame and the ends of said tie-rods bent around the frame or secured in any other suitable manner. The key-rods D are then successively put into position by passing them over the springs transversely to the tie-rods C and beneath the loops of the latter, the ends of said key-rods D being secured, as by bending around the frame or otherwise. This results in a very positive interconnection of the springs and the forming of such a surface as will not yield unduly at any one point, pressure at any point involving the depression of a considerable area of the bed-bottom surface. The fact is also to be noted that the key-rods D, extending midway over the rings B, prevent the central portion of the spring from pushing upward through the ring B', as is sometimes the case when the upper portion of the spring is left unprotected.

It should be noted that the parts $C^2$ of the loops C' are only long enough to let the key-rods pass under strain.

The modification shown in Fig. 2 differs from that shown in Fig. 1 only in that the loop C' after passing through the first ring passes over and downward through the second ring instead of under and upward through the second ring, as in Fig. 1.

In Fig. 3 the frame is omitted. The ends of the tie-rods C are wound around the spring-rings or otherwise secured, and the loops C' of the outer tie-rod are bent around the adjacent spring-rings. The ends of the key-rods engage both the last loop and ring in the same manner that they engage the last loop and frame in Fig. 1.

It will be understood that my invention may be applied to spring-seats and that the foregoing description is applicable to spring-seats as well as to spring bed-bottoms.

The construction herein described is also described, but not separately claimed, in "Case A," to which reference has been made.

I claim as my invention—

1. The combination of spiral springs having their ends formed into rings, single, parallel tie-rods extending across said springs and bearing lateral loops extending upward through the rings of one row of springs and laterally across and vertically through the adjacent rings of the adjacent row of springs, and key-rods arranged transversely to the said tie-rods and extending midway along rows of springs and through said loops where the latter extend through the springs, substantially as shown and described.

2. The combination of spiral springs having their ends formed into rings, single, parallel tie-rods extending across said springs and bearing lateral loops extending upward through the rings of one row of springs and laterally beneath and upward through the adjacent rings of the adjacent row of springs, and key-rods arranged transversely to the said tie-rods and extending midway along rows of springs and beneath said loops where the latter rise through the spring-rings, substantially as shown and described.

3. The combination of a rectangular frame and spiral springs having their ends formed into rings, single, parallel tie-rods extending across said frame and bearing lateral loops extending upward through the rings of one row of springs and laterally beneath and upward through the adjacent rings of the adjacent row of springs, and key-rods arranged transversely to the said tie-rods and extending midway over rows of springs and beneath said loops where the latter rise through the spring-rings, substantially as shown and described.

4. The combination of spiral springs having their ends formed into rings, single, parallel tie-rods extending across said springs and bearing lateral loops extending upward through the rings of one row of springs and laterally across and vertically through the adjacent rings of the adjacent row of springs, and key-rods arranged transversely to the said tie-rods and extending midway over rows of springs and through said loops where the latter extend through the spring-rings and said key-rods having their ends suitably secured, substantially as shown and described.

5. The combination of spiral springs having their ends formed into rings, single, parallel tie-rods extending across said springs and bearing lateral loops extending upward through the rings of one row of springs and laterally beneath and upward through the adjacent rings of the adjacent row of springs, and key-rods arranged transversely to the said tie-rods and extending midway over rows of springs and beneath said loops where the latter rise through the spring-rings and said key-rods having their ends suitably secured, substantially as shown and described.

6. The combination of a rectangular frame and spiral springs having their ends formed into rings, single, parallel tie-rods extending across said frame and bearing lateral loops extending upward through the rings of one row of springs and laterally beneath and upward through the adjacent rings of the adjacent row of springs, and key-rods arranged transversely to the said tie-rods and extending midway over rows of springs and beneath said loops where the latter rise through the spring-rings and said key-rods having their ends suitably secured to said frame, substantially as shown and described.

7. The combination of spiral springs having their ends formed into rings, single, parallel tie-rods extending across the said springs and bearing lateral loops integral with said tie-rods and extending upward through the rings of one row of springs and laterally beneath and upward through the adjacent rings of an adjacent row of springs, and key-rods arranged transversely to the said tie-rods and extending midway over rows of springs and beneath said loops where the latter rise through the spring-rings, substantially as shown and described.

8. The combination of a rectangular frame and spiral springs having their ends formed into rings, single, parallel tie-rods extending across the said frame and bearing lateral loops integral with said tie-rods and extending upward through the rings of one row of springs and laterally beneath and upward through the adjacent rings of an adjacent row of springs, and key-rods arranged transversely to the said tie-rods and extending midway over rows of springs and beneath said loops where the latter rise through the spring-rings, substantially as shown and described.

9. The combination of a rectangular frame, spiral springs having their ends formed into rings, single, parallel tie-rods extending across the said frame and bearing lateral loops integral with the said tie-rods and extending upward through the rings of one row of springs and laterally beneath and upward through the adjacent rings of an adjacent row of springs, and key-rods arranged transversely to said tie-rods and extending midway over rows of springs and beneath said loops where the latter rise through the spring-rings and said key-rods having their ends suitably attached to said frame, substantially as shown and described.

10. The combination of a rectangular frame, spiral springs arranged in rows and having their ends formed into rings, single, parallel tie-rods extending across said frame and springs and bearing lateral loops extending upward through the rings of one row of springs and laterally beneath and upward through the adjacent rings of the adjacent row of springs, and one such tie-rod parallel to the others and having its loops extending through the rings of a marginal row of springs and around the adjacent portion of said rectangular frame, and key-rods arranged transversely to the said tie-rods and extending along said springs and through said loops, substantially as shown and described.

11. The combination of a rectangular frame, spiral springs arranged in rows and having their ends formed into rings, single, parallel tie-rods extending across said frame and springs and bearing lateral loops extending upward through the rings of one row of springs and laterally beneath and upward through the adjacent rings of the adjacent row of springs, and one such tie-rod parallel to the others and having its loops extending through the rings of a marginal row of springs and around the adjacent portion of said rectangular frame, and key-rods arranged transversely to the said tie-rods and extending along said springs and through said loops and around said frame, substantially as shown and described.

12. The combination of a rectangular frame, spiral springs arranged in rows and having their ends formed into rings, single, parallel tie-rods extending across said frame and springs and bearing lateral loops integral with said tie-rods and extending upward through the rings of one row of springs and laterally beneath and upward through the adjacent rings of the adjacent row of springs, and one such tie-rod parallel to the others and having its loops extending through the rings of a marginal row of springs and around the adjacent portion of said rectangular frame, and key-rods arranged transversely to the said tie-rods and extending along said springs and through said loops, substantially as shown and described.

13. The combination of a rectangular frame, spiral springs arranged in rows and having their ends formed into rings, single, parallel tie-rods extending across said frame and springs and bearing lateral loops integral with said tie-rods and extending upward through the rings of one row of springs and laterally beneath and upward through the adjacent rings of the adjacent row of springs, and one such tie-rod parallel to the others and having its loops extending through the rings of a marginal row of springs and around the adjacent portion of said rectangular frame, and key-rods arranged transversely to the said tie-rods and extending along said springs and through said loops and around said frame, substantially as shown and described.

In testimony whereof I affix my signature in presence of two witnesses.

JOHN F. GAIL.

Witnesses:
DORCHESTER MAPES,
CYRUS KEHR.